July 26, 1938.  J. AKERMAN  2,124,867
AIRFOIL FUEL TANK FOR AIRPLANES AND THE LIKE
Filed Oct. 26, 1934  2 Sheets-Sheet 1
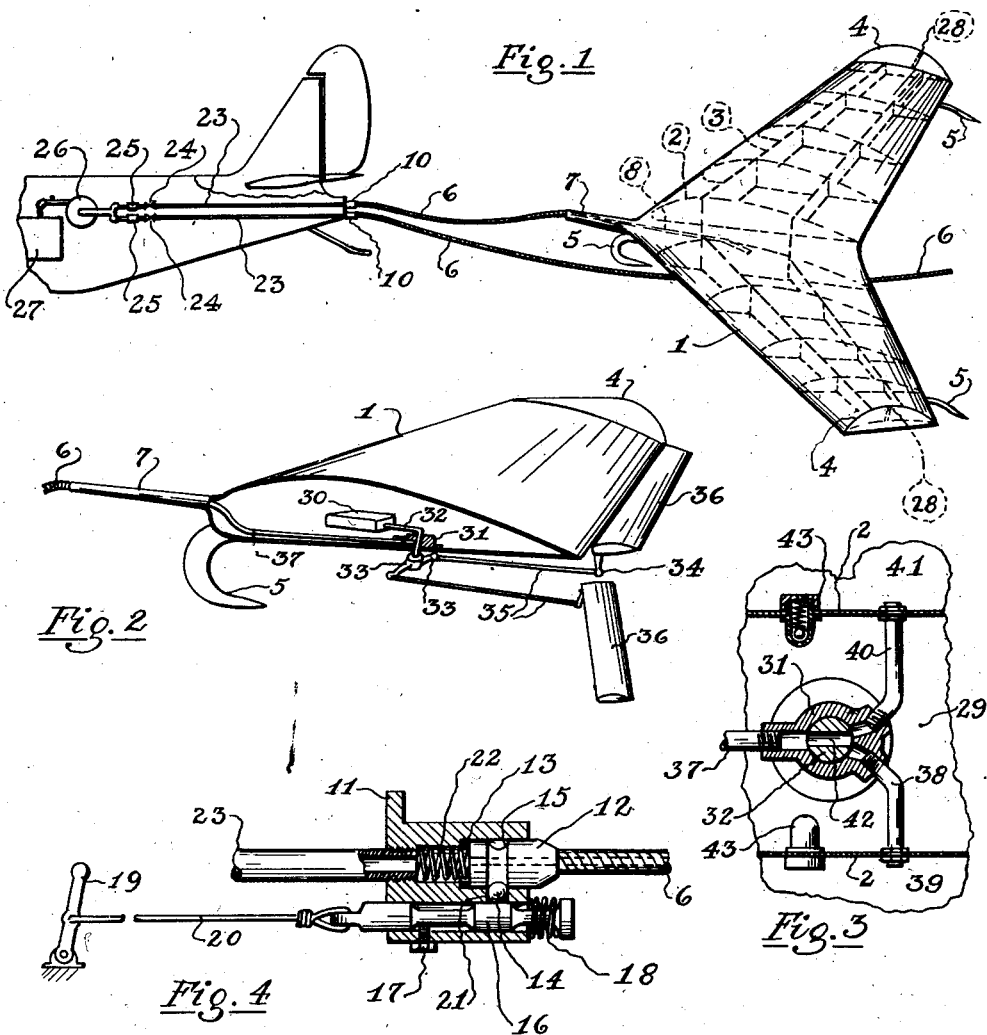

Inventor:
John Akerman

Patented July 26, 1938

2,124,867

UNITED STATES PATENT OFFICE 2,124,867

AIRFOIL FUEL TANK FOR AIRPLANES AND THE LIKE

John Akerman, Chicago, Ill., assignor, by mesne assignments, to Bendix Products Corporation, South Bend, Ind., a corporation of Indiana Application October 26, 1934, Serial No. 750,163

9 Claims. (Cl. 244—135)

The invention relates to improvements in airplane fuel tanks, and more particularly to an auxiliary fuel tank of airfoil shape to be towed, drawn, or carried by an airplane. The object of the invention is to provide an airplane with one or a plurality of selfsupporting fuel tanks for the purpose of increasing the range and capacity of said airplane, further to provide means for conveying the fuel from said airfoil tanks to the airplane during flight, and to provide means for disconnecting said fuel tanks when they have become empty.

It is well known that airplanes, to sustain flight, must have a certain wing area for a given load. Epecially in long distance flights, where the load decreases enormously due to fuel consumption, the airplane flies at an inefficient angle of attack most of the time, beginning with a too large angle at the start and ending with a negative angle when most of the fuel is consumed and the major part of the wing has become superfluous and merely acts as a parasite drag.

It is therefore the aim of my invention to provide an arrangement where the major part of the supporting surfaces flies at its most efficient angle of attack, by decreasing the carrying surface as fuel is consumed. The invention is therefore intended to be used where it is important to increase the range of a plane, as in long distance flights where the expense of throwing the fuel tank away can be afforded. But since fuel tanks constructed according to my invention have sufficient inherent stability, they may glide to earth safely and be used over again.

Figure 6:
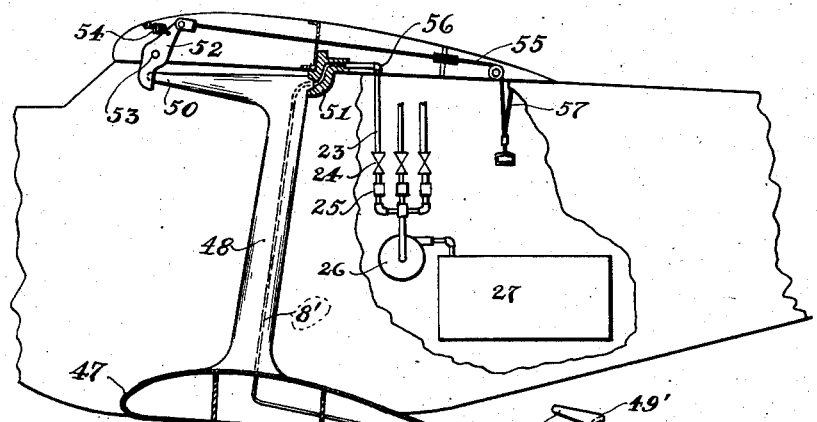
Figure 7:
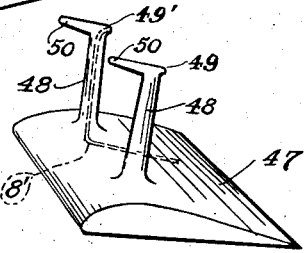

One form of the invention is shown in the accompanying drawings, in which Fig. 1 is a perspective view of an airfoil fuel tank towed by an airplane; Fig. 2 a diagrammatic view of the fuel tank with the left half cut away to show an arrangement of means for providing lateral stability; Fig. 3 a detail view of the same; Fig. 4 a sectional view of the release mechanism; Fig. 5 a diagram illustrating a system of rigging to provide stability; Fig. 6 a sectional side view of an airplane showing a modification of the invention; Fig. 7 a perspective view of the modified tank; and Fig. 8 a perspective view showing a further modification.

Referring to Fig. 1, there is shown an airfoil 1 having a tight hull to contain fuel. It is divided into a number of cells formed by the ribs 2 and trusses 3. The ribs are not perfectly tight against said hull, to permit creepage of fuel towards the center of the tank, but offer sufficient resistance to act as baffles to prevent shifting of the fuel. The airfoil has a large dihedral angle and sweepback, the first to provide sufficient inherent lateral stability to obviate ailerons, and the latter to provide longitudinal stability, which is accomplished by giving the air foil sections at the tips a smaller angle of incidence than those at the center. Directional stability is provided by end plates 4. Skids 5 are shown to constitute the landing gear. For starting with a heavy load, an undercarriage may be used which is free to disengage when the tank has reached flying speed. The airfoil 1 is towed by medium of a flexible hose or tube 6 securely connected to a rigid hollow joist 7 extending from said airfoil and having a pipe connection 8 leading to the lowest level of said airfoil tank 1. The joist 7 helps to assure directional stability of the fuel tank and provides a lever for the towing force exerted thru said tube 6 to coordinate the angle of attack of the fuel tank to the movements of the towing plane 9. The latter may be of any desired type, it only having a provision for a release mechanism 10 consisting of a housing 11 (Fig. 4) securely fastened to the airplane structure, and having a socket into which fits the fuel tube end fitting 12 held against a gasket 13 by a steel ball 14 seated in the annular groove 15.. A rod 16 slidable in said housing and ordinarily held against a stop screw 17 by means of a spring 18 is operable by the pilot with a lever 19 and connecting rod or cable 20 which upon application permits the ball 14 to move downwardly thru the hole 21, disengaging the fitting 12, aided by the spring 22, whereby the fuel tank is released. Referring now again to Fig. 1, means are shown diagrammatically to convey the fuel from the airfoil tank thru the pipe 8, joist 7, tow tube 6, to the release mechanism 10, from there thru the pipe 23, a valve 24, a fuel flow indicator 25, thru a fuel suction pump 26 into the regular fuel tank 27 of the airplane. To allow suction, air is permitted to enter the airfoil tank thru check valves 28. These being of any known type, they are not shown in detail, nor repeated in the other views.

It is apparent that a plurality of airfoil tanks may be used. I have therefore shown another fuel line denoted by the same numerals, leading to a second airfoil tank not repeated on the drawings since it is substantially the same as that already shown. The valves 24 operable by the pilot serve to limit draught to the hindmost airfoil tank.

Referring now to Figs. 2 and 3, means for automatic lateral control are to be described. The airfoil tank consists of three tight compartments, each of which is again provided with baffles as shown in Fig. 1. The central compartment is big enough to house a float 30 pivoted about an axis perpendicular to the lateral axis of the airfoil tank and inclined to the longitudinal axis. The pivot bearing 31 is connected to the airfoil structure, and is adapted to take the stem or shaft 32 of the float, said shaft extending thru it and having at its lower extremity two arms 33 extending outwardly therefrom engaging horns 34 by means of rods 35 to control a pair of ailerons 36 pivoted to the trailing edge of the fuel tank. As is apparent from the drawings, the ailerons produce a stabilizing action as the lateral axis of the airfoil tank deviates from the horizontal plane and the float seeks its higher level. A further feature is incorporated in the bearing 31, which is constructed to function as a valve so that fuel is only drawn from the lower wing should the airfoil tank be unbalanced. The valve is formed by said bearing 31 having a fuel connection 37 leading to the joist 7, one fuel connection 38 to the left wing section or chamber 39, and another one, 40, to the right wing chamber 41. The shaft 32 of the float is provided with a hole 42 so that communication is established between fuel connection 37 and both wing chambers 39 and 41 when the float is exactly fore and aft, i. e., the tank is level. As soon as the tank becomes unbalanced the float seeks its higher level and shuts off fuel from the higher wing. To permit fuel in the center compartment 29 to be drawn out, check valves 43 are provided which allow the fuel to flow to the outer compartments, from where it takes the path already described.

Referring now to Fig. 5, a method is shown to increase inherent stability and also to provide braking means should the airfoil tank attain a too high speed. The joist 7' is shown somewhat modified, as it does not conduct the fuel, but merely guides the fuel tube 6 by means of an eye at its forward extremity. Said eye or guide is located well above the line 44—44 where the drag acts. The line L, where the lift component acts, is forward of the center of gravity of the tank, denoted by C. G. Thus when the speed has become too high and the flexible tube 6 slackens, the turning moment due to the eccentricity of lift and drag is allowed to pitch the airfoil tank to an inefficient angle of attack, increasing the drag and thereby checking the speed. While I consider the brake means just described sufficiently effective for most cases, I have devised a special arrangement to further aid the braking effect. A braking surface 45, similar to an aileron, pivoted to the airfoil tank is tended by a spring 46 to lie perpendicular, or almost perpendicular, to the air stream or line of traction. The flexible tube 6 leading to the airfoil tank also is mechanically connected with said braking surface 45, so that the towing force exerted thru the fuel line 6 overcomes the spring 46. An adjustable collar 6a secured to the fuel tube 6 normally rests against the eye of said joist 7' so that the braking surface conforms to the airfoil.

A modified form of the invention is shown in Fig. 6 where the airplane is adapted to rigidly hold the airfoil tanks. 47 denotes such a tank equipped with joists 48 whose upper portions have extensions 49, 49', and 50 fitting into sockets of parts that are secured to, or part of the structural members of the airplane. 51 shows such a socket into which 49' fits. It serves as fuel connection, a tube 8' leading to the tank, and another one, 23, thru a system already described in Fig. 1 to the regular tank 27. Another socket, not shown, is the same as 51 except that it has no fuel passage. The front ends of the extension 50 fit into sockets in levers 52, one only being shown. The pivot pin 53 is secured to the airplane structure. A spring 54 holds the socket in engagement. For the release a cable 55 is provided to each lever 52 to be pulled by the pilot. A plurality of tanks are symmetrically disposed on both sides of the airplane, and fuel is drawn simultaneously from two symmetrically opposite tanks, for which purpose the pipe 23 branches off at 56 to lead to the corresponding tank on the opposite side, as does 57, for simultaneous release.

Figure 8:
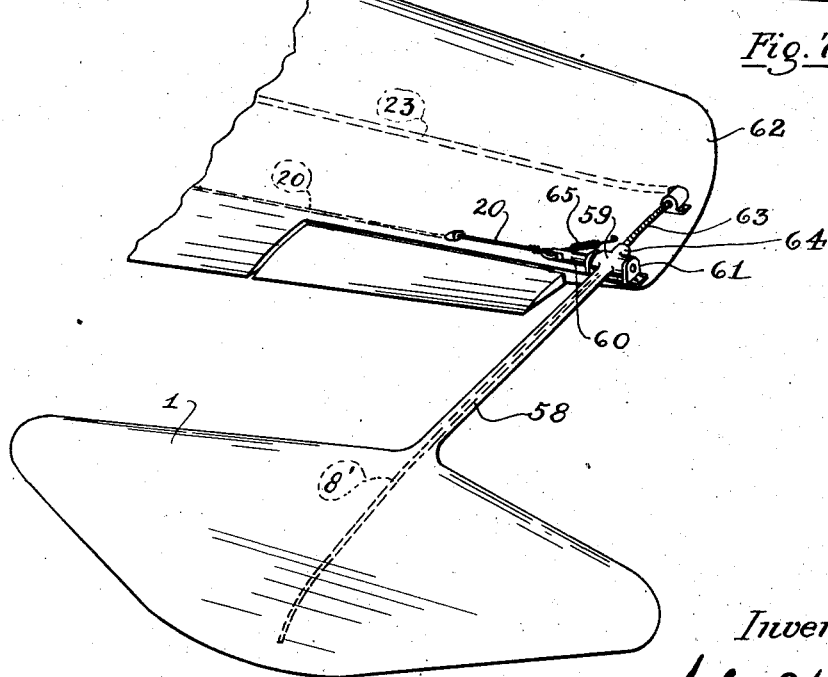

A further modified form is illustrated in Fig. 8, where the airfoil tank 1 has a rigid joist 58 extending therefrom whose forward extremity has a boss-shaped portion 59 adapted to take a pin 60 serving as a pivot held by a bracket 61 secured to the structural members of the wing 62 and connected to a cable 20 to be pulled by the pilot in the manner already described, simultaneously with that leading to the opposite wing. For the sake of simplicity the fuel connection between the usual line 23 and the joist 58 communicating with the airfoil tank compartment at the lowest level, is provided by a flexible hose 63 rigidly connected with 23 and having a sleeve or hollow plug at its other end fitting snugly into an extension or boss 64 adapted to take said sleeve and to disengage when the tank has been released. 59 has a passage provided within for the fuel, i. e., the center portion of the pivot hole is somewhat enlarged, so that the fuel flows from said flexible hose 63 around the pivot or release pin 60 into and thru the hollow joist 58. To prevent the pin 60 from falling out a spring 65 is provided.

The details of my invention have been shown in a crude form, to facilitate illustration. It is apparent that they can be made in different ways. It may be desirable to place the mechanism for stability control within the hull of the fuel tank, to improve streamline shape.

A further change within the scope of this invention is to give the fuel tank a shape similar to the conventional airplane having a tail. The form shown, however, is preferred because it gives the same stability with fewer parts.

I have called my invention airfoil fuel tank, or airfoil tank, by which I mean a fuel tank having airfoil shape, or a fuel tank producing lift when towed thru the air, or a self-sustaining fuel tank.

It is apparent that my invention can be carried out in ways different from that shown. I therefore do not wish to be limited in the application of my invention nor in the appended claims to the particular embodiment pointed out in the affixed drawings.

Further embodiments, modifications, and variations may be resorted to within the spirit and scope of the invention as here claimed.

I claim:

1. In a fuel supply system for an airplane including an engine having a carburetor, an auxiliary fuel tank of airfoil shape adapted to be connected to the airplane connecting means between the auxiliary tank and the carburetor, a float in the auxiliary tank, a valve operated by the float to direct fuel to the carburetor from the heavier and therefore the lower side of the auxiliary tank to aid in stabilizing the auxiliary tank, and manually operable means to disconnect the auxiliary tank from the airplane while in flight.

2. In a fuel supply system for an airplane, a main fuel tank carried by the airplane, an auxiliary fuel tank of airfoil shape, connecting means between the auxiliary tank and the main fuel tank, a float in the auxiliary tank, a valve operated by the float to direct fuel to the main fuel tank from the heavier and therefore the lower side of the auxiliary tank to aid in stabilizing the auxiliary tank, and means to release the auxiliary fuel tank in flight.

3. In a fuel supply system for an airplane including an engine having a carburetor, a main fuel tank carried by the airplane, an auxiliary fuel tank of airfoil shape, a float in the auxiliary tank, a valve operated by the float to direct fuel to the carburetor from the heavier and therefore the lower side of the auxiliary tank to aid in stabilizing the auxiliary tank, connecting means between the auxiliary tank and the airplane, means associated with the connecting means to vary the angle of attack of the auxiliary tank in accordance with its load, and manually operable releasing means to disconnect the auxiliary tank from the airplane.

4. In a fuel supply system for an airplane, an auxiliary fuel supply tank of airfoil shape, connecting means between the auxiliary tank and the airplane, and means associated with the connecting means to increase the resistance of the auxiliary tank when the connecting means is not subjected to tension.

5. In a fuel supply system for an airplane, an auxiliary fuel supply tank of airfoil shape, spoiler means associated with the auxiliary tank, connecting means between the auxiliary tank and the airplane, and means associated with the connecting means to move the spoiler means to an inoperative position when the connecting means is subjected to load.

6. In a fuel supply system for an airplane, an auxiliary fuel supply tank of airfoil shape, spoiler means associated with the auxiliary tank, connecting means between the auxiliary tank and the airplane, means associated with the connecting means to move the spoiler means to an inoperative position when the connecting means is subjected to load, and float operated valve means to direct fuel from the heaviest portion of the auxiliary tank to aid in stabilizing the auxiliary tank.

7. In an airplane, a main fuel tank, an auxiliary fuel tank of airfoil shape, releasable means to connect the auxiliary fuel tank to the airplane, connecting means between the auxiliary tank and the main tank, valve means operated by variations of fuel level to direct fuel from the heaviest portion of the auxiliary tank to assist in stabilizing the auxiliary tank, and means to vary the angle of attack of the auxiliary tank in accordance with its weight.

8. In an airplane, a main fuel tank, an auxiliary fuel tank of airfoil shape having a drag line defined as the line through the airfoil where the drag forces are exerted, and connecting means between the auxiliary tank and the airplane comprising a rigid joint extending forwardly and upwardly from the auxiliary tank to a point above the drag line and ahead of the center of gravity of the loaded tank whereby the resistance of the tank may be increased under certain operating conditions.

9. In an airplane, a main fuel tank, an auxiliary fuel tank of airfoil shape, connecting means between the auxiliary tank and the main tank, valve means operated by variations of fuel level to direct fuel from the heaviest portion of the auxiliary tank to assist in stabilizing the auxiliary tank, and connecting means between the auxiliary tank and the airplane comprising a rigid joint extending forwardly and upwardly from the auxiliary tank to a point above the drag line and ahead of the center of gravity of the loaded tank whereby the resistance of the tank may be increased under certain operating conditions.

JOHN AKERMAN.